United States Patent
Vangal-Ramamurthy et al.

(10) Patent No.: US 10,039,219 B1
(45) Date of Patent: Jul. 31, 2018

(54) METHOD AND DEVICES FOR PICKING AND PLACING WORKPIECES INTO DEVICES UNDER MANUFACTURE USING DUAL ROBOTS

(71) Applicant: Western Digital Technologies, Inc., Irvine, CA (US)

(72) Inventors: Jambunathan Vangal-Ramamurthy, San Jose, CA (US); Rahool Vasudevan, San Jose, CA (US); Roberto Perez, Salinas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 253 days.

(21) Appl. No.: 14/868,320

(22) Filed: Sep. 28, 2015

(51) Int. Cl.
*B25J 9/02* (2006.01)
*H05K 13/04* (2006.01)

(52) U.S. Cl.
CPC .......... *H05K 13/0404* (2013.01); *B25J 9/023* (2013.01); *H05K 13/0478* (2013.01)

(58) Field of Classification Search
CPC ... B25J 9/023; B25J 9/026; B25J 9/123; B25J 13/08; B65G 47/901; G06T 2207/30164; Y10S 901/16; Y10S 901/47; Y10T 29/49025
USPC ....... 414/589, 751.1, 752.1, 753.1; 700/259; 901/16, 47
See application file for complete search history.

(56) References Cited

U.S. PATENT DOCUMENTS

| | | |
|---|---|---|
| 5,351,621 A | 10/1994 | Tanaka et al. |
| 6,049,973 A | 4/2000 | Frank, Jr. et al. |
| 6,073,678 A | 6/2000 | Garza-Ondarza et al. |
| 6,467,153 B2 | 10/2002 | Butts et al. |
| 6,651,192 B1 | 11/2003 | Viglione et al. |
| 6,657,801 B1 | 12/2003 | Chue et al. |
| 6,671,580 B2 | 12/2003 | Campbell et al. |
| 6,687,093 B1 | 2/2004 | Butler et al. |
| 6,751,041 B1 | 6/2004 | Codilian et al. |
| 6,788,480 B1 | 9/2004 | Codilian et al. |

(Continued)

FOREIGN PATENT DOCUMENTS

DE    102013225116 A1  *  7/2015  ............ B25J 9/0084

OTHER PUBLICATIONS

Jambunathan Vangal-Ramamurthy, et al., U.S. Appl. No. 14/314,012, filed Jun. 24, 2014, 17 pages.

*Primary Examiner* — Anna M Momper
*Assistant Examiner* — Brendan P Tighe
(74) *Attorney, Agent, or Firm* — Barry IP Law (57) ABSTRACT

A device may comprise a track defining a common X-axis and first and second robots. The first robot may comprise a first X-axis driven element for movement along the track; a first Z-axis driven element, for moving parallel to a Z-axis and along the common X-axis; a first Y-axis driven element, attached to the first Z-axis driven element, for moving parallel to a Y-axis, the Z-axis and along the common X-axis. The second robot may comprise a second X-axis driven element for movement along the track; a second Z-axis driven element, for moving parallel to the Z-axis and along the common X-axis; a second Y-axis driven element, attached to the second Z-axis driven element, for moving parallel to a Y-axis, the Z-axis and along the common X-axis. The first and second robots have first and second end-effectors coupled to the first and second Y-axis drive elements, respectively.

21 Claims, 5 Drawing Sheets

(56) References Cited

U.S. PATENT DOCUMENTS

| | | |
|---|---|---|
| 6,791,782 B1 | 9/2004 | Codilian et al. |
| 6,792,669 B2 | 9/2004 | Codilian |
| 6,798,592 B1 | 9/2004 | Codilian et al. |
| 6,871,596 B2 | 3/2005 | De-Gol |
| 6,894,861 B1 | 5/2005 | Codilian et al. |
| 6,897,393 B1 | 5/2005 | Codilian et al. |
| 6,898,044 B1 | 5/2005 | Chheda |
| 6,943,972 B1 | 9/2005 | Chue et al. |
| 7,003,626 B1 | 2/2006 | Chheda et al. |
| 7,027,242 B1 | 4/2006 | Terrill et al. |
| 7,046,467 B1 | 5/2006 | Chheda |
| 7,058,759 B1 | 6/2006 | Reiser et al. |
| 7,072,129 B1 | 7/2006 | Cullen et al. |
| 7,076,391 B1 | 7/2006 | Pakzad et al. |
| 7,076,603 B1 | 7/2006 | Chheda |
| 7,136,242 B1 | 11/2006 | Chue et al. |
| 7,139,145 B1 | 11/2006 | Archibald et al. |
| 7,145,744 B1 | 12/2006 | Clawson et al. |
| 7,178,432 B1 | 2/2007 | Han et al. |
| 7,199,959 B1 | 4/2007 | Bryant |
| 7,203,020 B1 | 4/2007 | Viglione et al. |
| 7,209,310 B1 | 4/2007 | Tsai et al. |
| 7,222,410 B1 | 5/2007 | Klassen et al. |
| 7,236,911 B1 | 6/2007 | Gough et al. |
| 7,269,525 B1 | 9/2007 | Gough et al. |
| 7,458,282 B1 | 12/2008 | Wuester, Sr. et al. |
| 7,490,398 B1 | 2/2009 | Klassen et al. |
| 7,506,553 B1 | 3/2009 | Panyavoravaj |
| 7,549,204 B1 | 6/2009 | Vangal-Ramamurthy et al. |
| 7,552,526 B1 | 6/2009 | Klassen et al. |
| 7,559,590 B1 | 7/2009 | Jones |
| 7,561,416 B1 | 7/2009 | Sarraf |
| 7,596,722 B1 | 9/2009 | Pakzad et al. |
| 7,634,375 B1 | 12/2009 | Pakzad et al. |
| 7,653,983 B1 | 2/2010 | Klassen |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,743,486 B1 | 6/2010 | Klassen et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan et al. |
| 7,974,038 B2 | 7/2011 | Krishnan et al. |
| 7,980,159 B1 | 7/2011 | Han |
| 7,987,585 B1 | 8/2011 | Klassen et al. |
| 8,066,171 B1 | 11/2011 | Rakpongsiri et al. |
| 8,078,421 B1 | 12/2011 | Shastry et al. |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,199,425 B1 | 6/2012 | Gustafson et al. |
| 8,218,256 B1 | 7/2012 | Lin |
| 8,223,448 B1 | 7/2012 | Haw et al. |
| 8,230,570 B1 | 7/2012 | Choong |
| 8,245,601 B1 | 8/2012 | Hastama et al. |
| 8,267,831 B1 | 9/2012 | Olsen et al. |
| 8,270,118 B1 | 9/2012 | Cheng et al. |
| 8,276,739 B2 | 10/2012 | Bastian, II et al. |
| 8,300,338 B1 | 10/2012 | McFadyen |
| 8,307,537 B1 | 11/2012 | Klassen et al. |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 * | 10/2013 | Vangal-Ramamurthy ........ B23P 19/007 29/603.03 |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 8,707,531 B1 | 4/2014 | Sungkhaphong et al. |
| 8,713,333 B1 | 4/2014 | Selvaraj |
| 8,763,790 B1 | 7/2014 | Neamsuwan et al. |
| 8,789,446 B1 | 7/2014 | Sungkhaphong et al. |
| 8,807,073 B2 | 8/2014 | Haas et al. |
| 8,811,135 B1 | 8/2014 | Kasino et al. |
| 8,911,193 B2 | 12/2014 | Rice et al. |
| 2002/0147960 A1 | 10/2002 | Jevtic et al. |
| 2002/0185359 A1 | 12/2002 | Livingston et al. |
| 2008/0084630 A1 | 4/2008 | Trongjitwikrai et al. |
| 2008/0089190 A1 | 4/2008 | Green et al. |
| 2008/0166210 A1 | 7/2008 | Hudgens et al. |
| 2009/0157848 A1 | 6/2009 | Khoo |
| 2010/0108256 A1 | 5/2010 | Roajanasiri et al. |
| 2012/0031333 A1 | 2/2012 | Kurita et al. |
| 2013/0057986 A1 | 3/2013 | Vangal-Ramamurthy et al. |
| 2013/0248545 A1 | 9/2013 | Thongjitti et al. |

\* cited by examiner

METHOD AND DEVICES FOR PICKING AND PLACING WORKPIECES INTO DEVICES UNDER MANUFACTURE USING DUAL ROBOTS

BACKGROUND

During the manufacturing of devices (e.g., mechanical, electromechanical, and electrical devices), an assembly device is typically utilized to connect components of the device under manufacture or assembly. Due to the complexity of high-tech devices, and the cost competiveness of the high-tech industry, the components of high-tech devices need to be assembled in a precise, time effective, and cost-efficient manner. Examples of high-tech devices may include: computing devices, data storage devices, computing devices, mobile devices, and the like.

DETAILED DESCRIPTION

Complex devices may include many components and the manufacture thereof may require a longer assembly line that include a large number of manufacturing stations to carry out batch assembly activities. Some automation processes feature a single robot controlling a single tool, with each tool having robot-mounted camera that is used to take a picture before picking a component, with the same robot-mounted camera being used to take picture before placing the part onto the device under manufacture. Material or parts may be kept on fixed component tray, which requires the robot to travel (worst case scenario) all the way to the last position of the last part to be placed, which is costly in terms of both time and wear and tear of the tool.

One embodiment, therefore, is a device configured to pick and place workpieces intended for devices under manufacture or assembly. According to one embodiment, such a device, which may be characterized as a robotic assembly station, may comprise both a first robot and a second robot. One, or both of these first and second robots may be configured to pick and place workpieces intended for devices under manufacture or assembly. Alternatively, one or both of the first and second robots may be configured for other activities that do not require such a pick and place operation. According to one embodiment, the first and second robots may pick and place workpieces for the same device under manufacture or for different devices under manufacture. In so doing, the robot station may assist in high throughput, accurate manufacturing activities.

The device may, according to one embodiment, be configured to operate in a clean room environment such as, for example, a class 1-10 clean room environment suitable for some or all of the assembly process.

Figure 1:
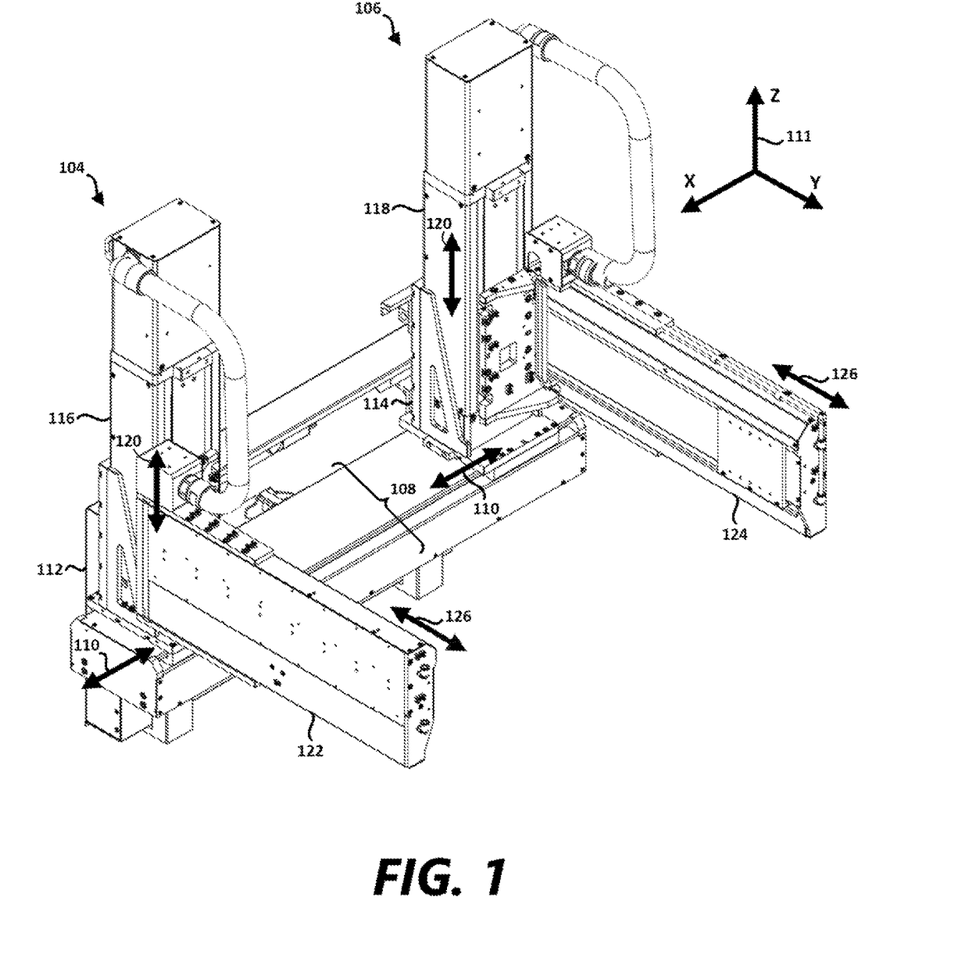
FIG. 1 is a perspective view showing aspects of a device configured to support a first and a second robot, according to one embodiment.
Figure 2:
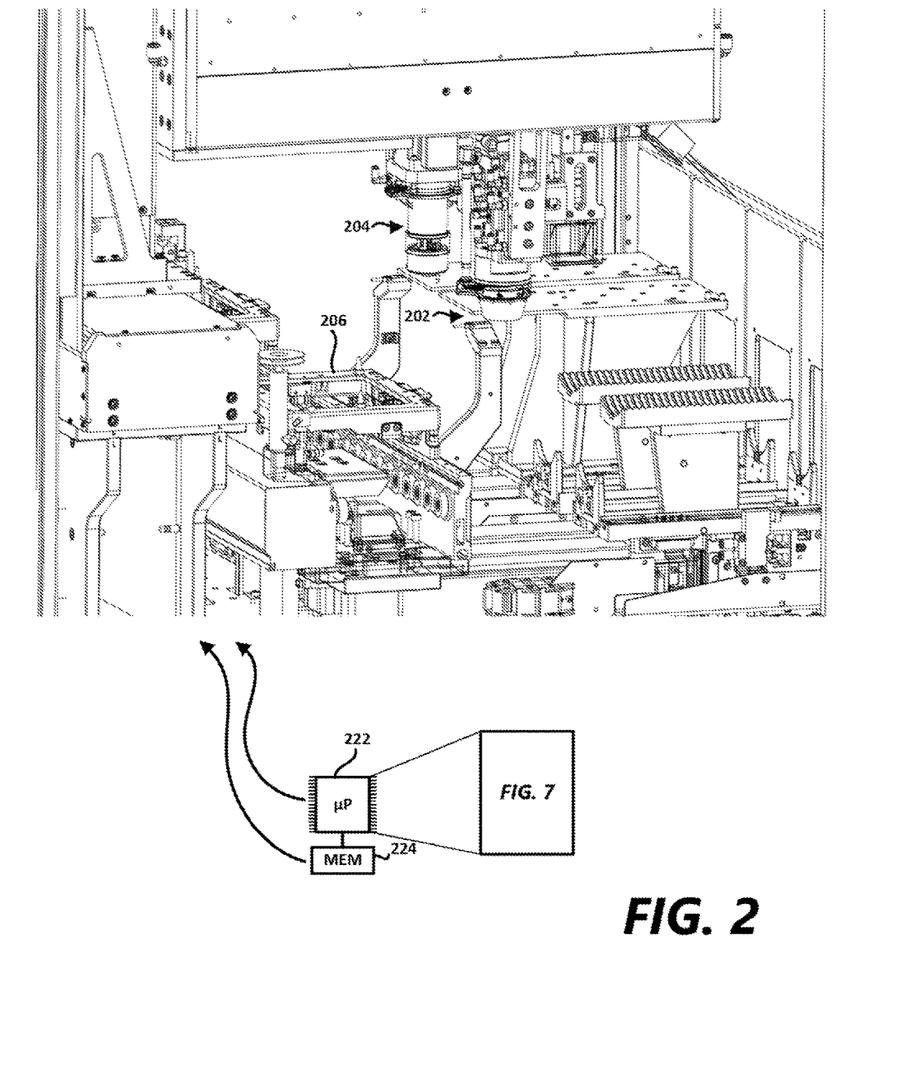
FIG. 2 shows another view of a device according to one embodiment, showing the first and second robots, first and second end-effectors and devices under manufacture.

FIG. 1 is a perspective view showing aspects of device configured to support a first and a second robot, according to one embodiment. The device, according to one embodiment, may be configured to support the first and second robots in a robotic assembly station. FIG. 2 shows another view of a device according to one embodiment, showing the first and second robots, first and second end-effectors and devices under manufacture such as a data storage device, a base of which is shown at 206. As shown in FIGS. 1 and 2, therein, the device may comprise one or more controllers or microprocessors, as shown at 222 in FIG. 2. Coupled to the microprocessor(s) or controller(s) 222 is storage 224, which may include volatile and/or non-volatile memory. The microprocessor(s) or controller(s) 222 may be configured to access and execute one or more programs stored in storage 224 to carry out one or more manufacturing or assembly steps of a method according to one embodiment.

As shown in FIG. 1, the device may comprise a track 108 that may extend parallel to an X-axis, as suggested by coordinate system 111. A first robot 104, a portion of which is shown in FIG. 1, may be controlled by the microprocessor(s) or controller(s) 222 for movement along the track 108. A portion of a second robot 106 is also shown in FIG. 1, which second robot 106 may also be controlled by the microprocessor(s) or controller(s) 222 for movement along the same track 108. In this manner, both the first and second robots 104, 106, may be configured for movement parallel to the X-axis, along the same track 108. The track 108, therefore, constitutes a common X-axis along which both the first and second robots 104, 106 may move, as suggested by arrows 110 in FIG. 1. To enable such movement by the first robot 104 along the track 108, the first robot may comprise a first X-axis driven element 112 configured for movement along the track 108 that defines the common X-axis for both the first and second robots 104, 106. A first Z-axis driven element 116 may be provided, to enable the first robot 104 to move parallel to the Z-axis. According to one embodiment, the first Z-axis driven element 116 may be attached to the first X-axis driven element 112 to thereby configure the first robot 104 for selective movement parallel to the Z-axis as well as along the common X-axis defined by the track 108. A first Y-axis driven element 122 may be provided and may be configured for movement along the Y axis. The first Y-axis driven element 122 may, according to one embodiment, be attached to the first Z-axis driven element 116. In this manner, the first Y-axis element 122 may be configured for selective movement parallel to the Y-axis, for movement parallel to the Z-axis by virtue of its attachment to the Z-axis drive element 116 and along the common X-axis by virtue of its attachment to the first X-axis driven element 112 and to the common X-axis along which the track 108 is aligned. As shown in FIG. 2, a first end-effector 202 may be attached to the first Y-axis driven element 122. The end effector 202 may also be configured for rotation about a theta axis. The first end effector 202 may be configured for acting upon a device under manufacture such as, for example, a data storage device.

The first end-effector 202 may comprise, for example, a gripper, such as a vacuum gripper or a two or three jaw gripper, for example. Alternatively, the first end effector 202 may comprise a screwdriver, welder, vacuum head, or other well-known types of robotic tools to act upon or otherwise engage a workpiece and/or the device under manufacture. Exemplary workpieces for data storage devices may include, for example, memory chips, head stack assemblies, ramps, disks, screws, fasteners and the like.

Returning now to FIG. 1, one embodiment may also comprise a second robot 106, also controlled by the by the microprocessor(s) or controller(s) 222. The second robot 106 may comprise a second X-axis driven element 114 configured for movement along the track 108 that defines the common X-axis. In this manner, both the first robot 104 and the second robot 106 are configured for movement along the common axis defined by the track 108. According to one embodiment, the second robot 106 may also comprise a second Z-axis driven element 118, which may itself be attached to the second X-axis driven element 114. In this manner, the second robot 106 may be configured for selective movement parallel to the Z-axis 120 and along the common X-axis defined by the track 108. In one embodiment, the second robot 106 may also comprise a second Y-axis driven element 124. The second Y-axis driven element, according to one embodiment, may be attached to the second Z-axis driven element 118, thereby enabling the second Y-axis driven element to selectively move parallel to a Y-axis as shown at 126, parallel to the Z-axis as shown at 120 and along the common X-axis, as suggested at 110. As shown in FIG. 2, a second end-effector 204 may be attached to the first Y-axis driven element 122. The first end effector 204 may also be configured for rotation about a theta axis and may be configured for acting upon a device under manufacture such as, for example, a data storage device. According to one embodiment, the second robot 106 may be configured to act upon the same device under manufacture as the first robot 104 or a different device under manufacture.

Similar to the first end effector 202, the second end-effector 204 may comprise, for example, a gripper, such as a vacuum gripper or a two or three jaw gripper, for example. Alternatively, the second end effector 204 may comprise a screwdriver, welder, vacuum head, or other well-known types of robotic tools to act upon or otherwise engage a workpiece and/or the device under manufacture. The first and second end effectors may be of the same type or the first and second end effectors may be of different types, configured for different demands.

The first robot 104 may be configured to move together with the second robot 106 or independently thereof. Similarly, the end effectors 202, 204 may be configured to act in unison or independently of one another. For example, the first robot 104 may be controlled to move according to a first predetermined set of movements along the common X-axis and parallel to the Y and Z axes while the second robot may be simultaneously controlled for a second predetermined set of movements along the common X-axis and parallel to the Y and Z axes (or for no movement at all). Similarly, the first end effector 202 may be configured to carry out a given task while the second end effector may be configured to carry out a same or a different task, before, during or after the first end effector carries out its given task upon the same or a different device under manufacture.

Figure 3:
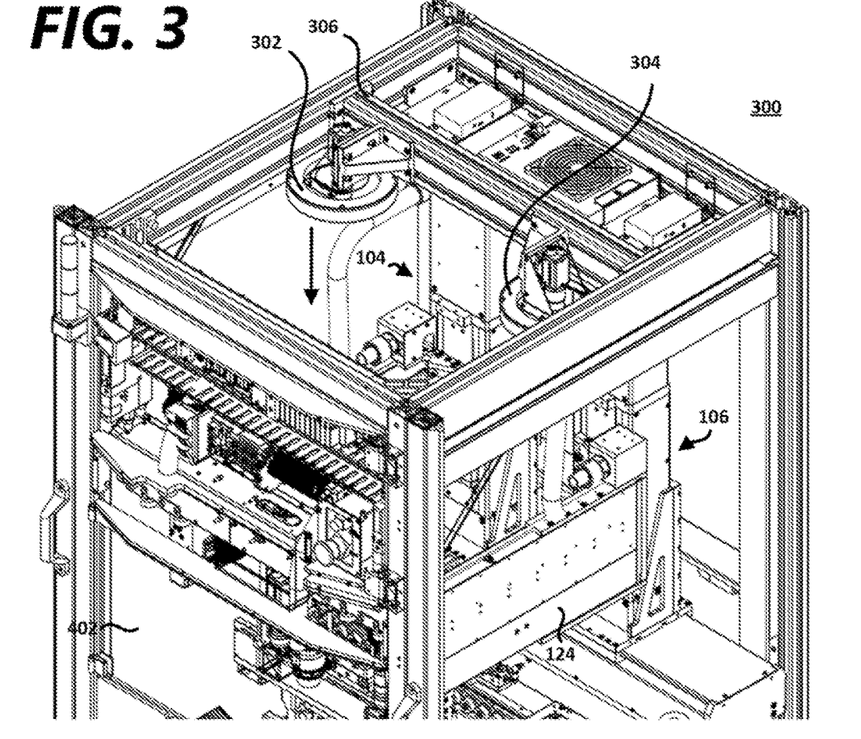
FIG. 3 is a top view of a station configured to house at least the first and second robots, provided with downward-looking cameras, according to one embodiment.

FIG. 3 is a top view of an assembly station 300 configured to house and support the first and second robots 104, 106. As shown, a first downward-looking camera 302 may be mounted on a fixed support 306 above the first robot 104. Similarly, a second downward-looking camera 304 may be mounted on the fixed support 306 above the second robot 106. According to one embodiment, the first downward-looking camera 302 may be configured to capture an image or images of a workpiece of a device under manufacture, with the captured image(s) being processed by the microprocessor(s) or controller(s) 222 to position and/or operate the first end-effector 202. According to one embodiment, the second downward-looking camera 304 may be configured to capture an image or images of a workpiece of another device under manufacture, with the captured image(s) being processed by the microprocessor(s) or controller(s) 222 to position and/or operate the second end-effector 202. As shown in FIG. 3, the first and second downward-looking cameras 302, 304 may be affixed to fixed support 306, so as to be stationary generally above the first and second end effectors 202, 204. The fixed downward-looking cameras 302, 304 may be configured to take pictures while the robots 102, 104 are performing the picking operation (i.e., removing a workpiece from a workpiece supply tray or other support). Other cameras, still and/or video may be provided to enhance the machine-vision capabilities of the first and second robots 104, 106.

In one embodiment, for example, a first robot-mounted camera may be attached to the first robot 104 and a second robot-mounted camera may be attached to the second robot 106. Such robot-mounted cameras may, therefore, be configured to move along with the first and second robots 104, 106 and the images taken thereby may be used, for example, for calibration purposes to find the location from where the part or workpiece may be picked. Other cameras may be provided such as, for example, upward-looking cameras provided underneath the device or devices under manufacture or assembly, for guidance purposes and/or for quality control. In one implementation, an upward-looking camera may be centered on a calibration assembly such as a reticule, to precisely calibrate the position of the first and/or second robots, among other purposes.

According to one embodiment, the first and second X-axis driven elements 112, 114 each may comprise a linear motor configured to drive the first and second robots 104, 106 along the common X-axis defined by the track 108. Similarly, the first and second Z-axis driven elements 116 each may comprise a linear motor configured to drive the first and second robots 104, 106 parallel to the Z-axis. Also, the first and second Y-axis driven elements 122, 124 each comprise a linear motor configured to drive the first and second robots 104, 106 parallel to the Y-axis. According to one embodiment, the first and second robots 104, 106 may also comprise a motor configured for rotation about a theta axis; that is, moved about a predetermined axis or rotation, in addition to movement along the common X-axis and the Y and Z axes.

Figure 4:
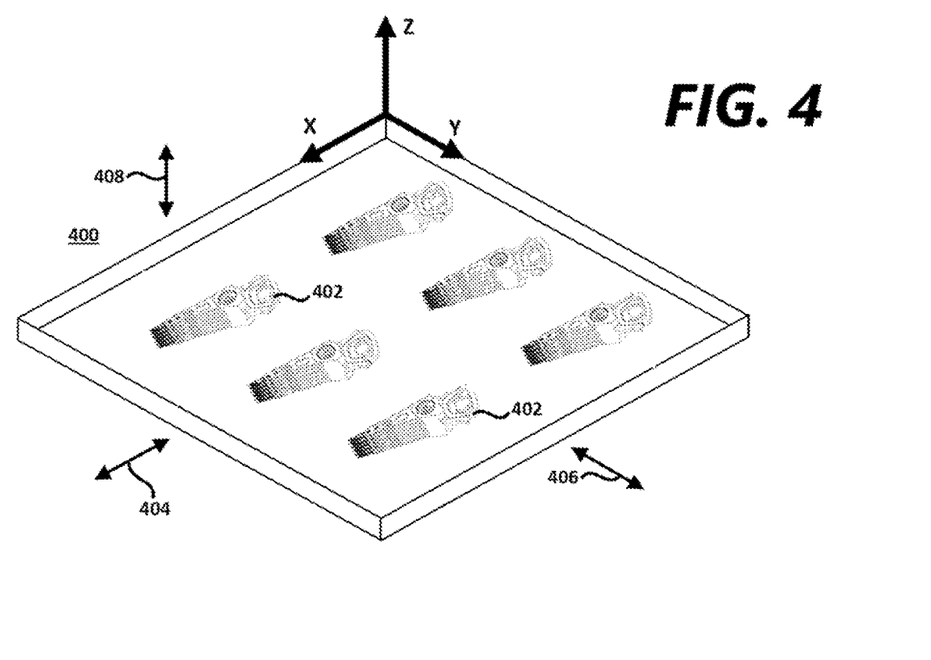
FIG. 4 is a perspective view of a movable workpiece supply tray, according to one embodiment.

FIG. 4 is a perspective conceptual view comprising a movable workpiece supply tray 400, according to one embodiment. According to one embodiment, the workpiece supply tray 400 may be configured to supply a plurality of workpieces to the first and second robots 104, 106, for integration thereof into the devices under manufacture. In exemplary FIG. 4, the devices under manufacture comprise data storage devices comprising hard disk drives and the workpieces 402 comprise actuator assemblies. The workpiece supply tray 400 may comprise molded recesses configured to accommodate the workpieces at a known location and in a known orientation, so as to facilitate the pick and place process carried out by the first and second robots 104, 106. According to one embodiment, the workpiece supply tray 400 may be configured to support a supply of workpieces 402 to be integrated into the devices under manufacture, and the workpiece supply tray or trays 400 may be disposed within reach of the first and/or second end-effectors 202, 204. To facilitate and speed up the pick and place process, one embodiment calls for the workpiece supply tray 400 to be selectively moveable along at least one of the X directions 404, the Y directions 406 and the Z directions 408. In one implementation, the workpiece supply tray 400 may be configured to move after each pick operation by one of the first and second robots 104, 106. According to one embodiment, the movement of the workpiece supply tray 400 may be determined to minimize the movement of the first and/or second robots 104, 106 as they pick the next workpiece 402 from the workpiece supply tray. This avoids the first and second robots 104, 106 from having to move progressively further away from the devices under manufacture as they pick the workpieces off of the workpiece supply tray 400. One or more linear motors may be provided and controlled by the microprocessor(s) or controller(s) 222 to suitably move the workpiece supply tray 400 along the X, Y and/or Z directions to minimize the distance and/or travel time to pick the next workpiece 402.

Figure 5:
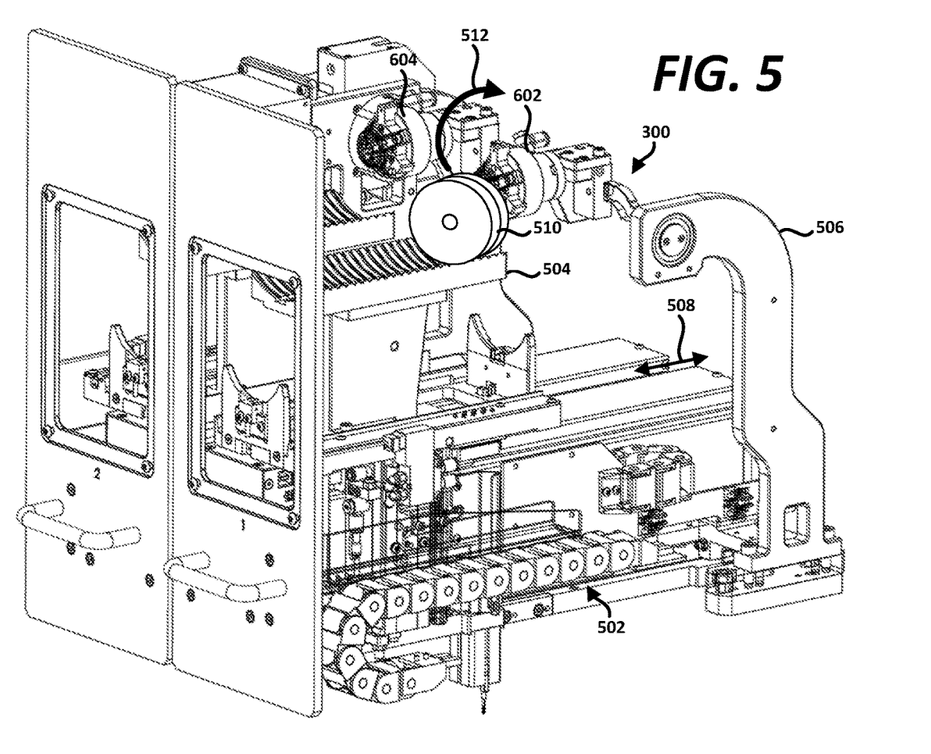
FIG. 5 shows a device, configured to remove at least one workpiece from the workpiece supply tray, and transfer the removed workpiece to the first and/or the second robots for integration into the device or devices under manufacture, according to one embodiment.
Figure 6:
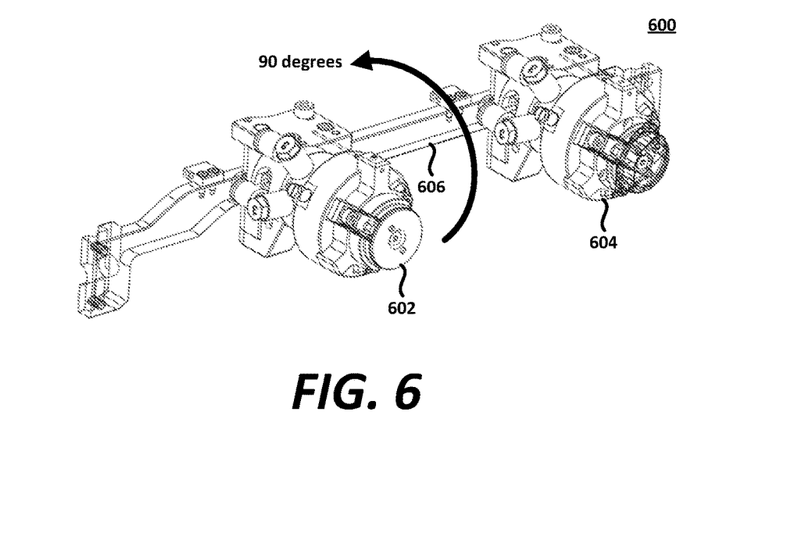
FIG. 6 shows another movable workpiece supply tray according to one embodiment.

In one embodiment, the first and/or second end-effector 202, 204 may be configured to remove one or more workpieces, such as workpieces 402 in FIG. 4 from the workpiece supply tray or trays 400. The picked workpiece(s) 402 may then be integrated into the device or devices under manufacture such as, for example, a data storage device. The picked workpieces may be rotated as needed to put them in the proper orientation for integration into the devices under manufacture. The end effector that picks the workpiece from the workpiece supply tray 400 may be the same end effector that integrates the workpiece into the device under manufacture. However, this need not be the case. As shown in FIGS. 5 and 6, one embodiment may comprise additional robots or robotic mechanisms, such as third robot 602 and/or fourth robot 604, pivotally mounted on support 506. According to one embodiment, the third and fourth robots (or programmatically-controlled devices) 602, 604 each may be configured to remove one or more workpieces from the workpiece supply tray, and transfer the removed workpiece(s) to the first and/or second end-effectors 202, 204 for integration into the device or devices under manufacture.

In FIG. 5, the workpiece supply tray is shown at 504. In this implementation, the workpiece supply tray is not a flat tray as shown at 400 in FIG. 4. Instead, as shown, the workpiece supply tray 504 may be configured to present a series of workpieces 510, one in front of the other, with each workpiece disposed in a respective slot. As shown in FIG. 5, the workpieces 510 are magnetic disk platters destined to be integrated into a hard disk drive under manufacture. As shown, the third and fourth robots 602, 604 may comprise end effectors configured as grippers. The grippers of the third and fourth robots each may be configured to engage a magnetic disk platter 510, grip and remove the engaged magnetic disk platter from the workpiece supply tray 504. According to one embodiment, the third and fourth robots 602, 604 may also be configured to, as suggested by the curved arrow 512 in FIGS. 5 and 6, rotate the removed workpiece for presentation to the first and second end-effectors 202, 204, which may then complete the next manufacturing step (e.g., integrating the magnetic disk platter onto the hard disk drive or other data storage device under manufacture.)

As suggested in FIG. 5, the workpiece supply tray 504 may be configured to be moveable. That is, according to one embodiment, the workpiece supply tray 504 may be coupled to a rail for movement along arrow 508. Moving the workpiece supply tray 504 enables the workpieces 510 to be disposed as close as possible to the third and fourth robots 602, 604, so that the workpieces may be grasped thereby without delay and presented to first and/or second end-effector 202, 204 and/or for other purposes. The workpiece supply tray 504 may be coupled to one or more workpiece supply tray motors, configured to move the workpiece supply tray 504 after a workpiece 510 is removed therefrom. According to one embodiment the workpiece supply tray 504 and/or other components may be coupled to a chain drive, as suggested at 502 in FIG. 5.

Figure 7:
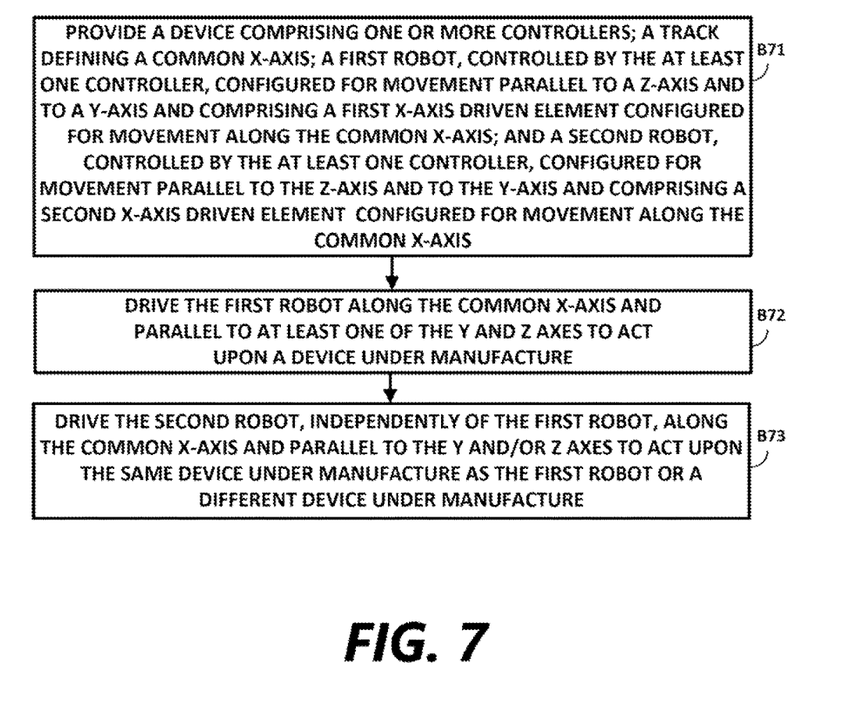
FIG. 7 is a flowchart of a method according to one embodiment.

FIG. 7 is a flowchart of a method according to one embodiment. As shown in block B71, the method may include providing a device comprising one or more controllers, a track defining a common x-axis, a first robot and a second robot. The first robot, controlled by the controller(s), may be configured for movement parallel to a Z-axis and to a Y-axis and may comprise a first X-axis driven element configured for movement along the track defining the common X-axis. The second robot, also controlled by controller(s), may be configured for movement parallel to the Z-axis and to the Y-axis and may comprise a second X-axis driven element that is configured for movement along the track defining the common X-axis. As shown at B72, the first robot may be driven along the common X-axis and parallel to the Y and/or Z axes to act upon a device under manufacture. Lastly, as shown at B73, the second robot may be driven, independently of the first robot, along the common X-axis and parallel to the Y and/or Z axes to act upon the same device under manufacture as the first robot or a different device under manufacture.

According to one embodiment, the first robot further may comprise a first end-effector and the method may further comprise the controller(s) guiding the first end effector based upon one or more images (still and/or video) obtained from one or more first cameras mounted to the first robot and/or one or more second cameras fixed above the first robot. The method may also comprise attaching the first end effector to a first Y-axis driven element configured to move the first robot parallel to the Y-axis. The first Y-axis driven element may be attached to a first Z-axis driven element that is configured to move the first robot parallel to the Z-axis and the first Z-axis driven element may be attached to a first X-axis driven element that is configured to move the first robot along the common X-axis.

The second robot, according to one embodiment, may further comprise a second end-effector and the method may further comprise guiding the second end effector based upon one or more images (still and/or video) obtained from a third camera mounted to the second robot and/or a fourth camera fixed above the second robot. In one embodiment, the second end effector may be attached to a second Y-axis driven element configured to move the second robot parallel to the Y-axis. The second Y-axis driven element may be attached to a second Z-axis driven element that is configured to move the second robot parallel to the Z-axis and the second Z-axis driven element may be attached to a second X-axis driven element configured to move the second robot along the common X-axis. The device may further comprise one or more workpiece supply trays configured to support a supply of workpieces to be integrated into the device or devices under manufacture by the first and/or second robots. The method may further comprise moving the workpiece supply tray after a workpiece is removed therefrom, as discussed relative to FIGS. 4 and 5 above. In one embodiment, such moving may comprise moving the one or more workpiece supply trays so as to minimize the travel of the first and/or second robots as workpieces are removed from the workpiece supply tray(s) during manufacture of the device or devices.

Significantly, one embodiment comprising dual first and second robots is less costly, occupies less factory floor real estate and enables an increase in the throughput, as compared to conventional, single robot devices. Moreover, as compared to conventional XYZ configurations, in which the end of the arm tooling is mounted to the Z axis, the actual moment arm to the Y axis includes weight of Z axis as well as that of the tooling, which configuration imposes limitations on the speed at which the actuators may be moved and requires heavy duty bearing sets. These constraints are lessened according to one embodiment, as the end effector is coupled to the Y-axis driven element, which is coupled to the Z-driven element. Lighter bearings may be used and higher speeds may be achieved using this configuration than had previously been possible.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

We claim:

1. A device, comprising:
   at least one controller;
   a track defining a common X-axis;
   a first robot, controlled by the at least one controller, comprising:
      a first X-axis driven element configured for movement along the track defining the common X-axis;
      a first Z-axis driven element, attached to the first X-axis driven element, configured for selective movement parallel to a Z-axis and along the common X-axis;
      a first Y-axis driven element, attached to the first Z-axis driven element, configured for selective movement parallel to a Y-axis, the Z-axis and along the common X-axis; and
      a first end-effector, attached to the first Y-axis driven element and configured for acting upon a device under manufacture; and
   a second robot, controlled by the at least one controller, comprising:
      a second X-axis driven element configured for movement along the track defining the common X-axis;
      a second Z-axis driven element, attached to the second X-axis driven element, configured for selective movement parallel to the Z-axis and along the common X-axis;
      a second Y-axis driven element, attached to the second Z-axis driven element, configured for selective movement parallel to the Y-axis, the Z-axis and along the common X-axis; and
      a second end-effector, attached to the second Y-axis driven element and configured for acting upon a device under manufacture; and
   wherein the device further comprises:
      a workpiece supply tray configured to support a supply of workpieces to be integrated into the device or devices under manufacture; and
      at least one workpiece supply tray motor configured to relocate the workpiece supply tray.

2. The device of claim 1, wherein the first and second robots are each configured for one of independent movement along at least one of the common X-axis and parallel to the Y and Z axes.

3. The device of claim 1, further comprising at least one of:
   a first downward-looking camera configured to capture an image of a workpiece of a device under manufacture, the captured image being used by the at least one controller to, at least one of, position and operate the first end-effector; and
   a second downward-looking camera configured to capture an image of a workpiece of a device under manufacture, the captured image being used by the at least one controller to, at least one of, position and operate the second end-effector.

4. The device of claim 1, further comprising, coupled to the at least one controller, at least one of a first robot-mounted camera attached to the first robot and a second robot-mounted camera attached to the second robot.

5. The device of claim 1, wherein at least one of the first X-axis driven element, the first and second Z-axis driven elements and the first and second Y-axis driven elements each comprise a linear motor.

6. The device of claim 1, wherein the first and second end-effectors are configured to act upon a same or a different device under manufacture.

7. The device of claim 1, wherein the at least one workpiece supply tray motor is further configured to relocate the workpiece supply tray within reach of at least one of the first and second end-effectors.

8. The device of claim 1, wherein at least one of the first and second end-effectors is configured to remove at least one workpiece from the workpiece supply tray and to integrate the removed at least one workpiece into the device or devices under manufacture.

9. The device of claim 1, further comprising at least one of a third robot and fourth robot, configured to remove at least one workpiece from the workpiece supply tray, and transfer the removed at least one workpiece to at least one of the first and second end-effectors for integration into the device or devices under manufacture.

10. The device of claim 9, wherein the at least one third and fourth robot is configured to rotate the removed at least one workpiece for presentation to at least one of the first and second end-effectors.

11. The device of claim 1, wherein the at least one workpiece supply tray motor is further configured to relocate the workpiece supply tray after a workpiece is removed therefrom.

12. The device of claim 1, wherein the device under manufacture includes a data storage device.

13. A method of operating a device comprising at least one controller, a track defining a common X-axis, a first robot controlled by the at least one controller, and a second robot controlled by the at least one controller, the method comprising:
   relocating a workpiece supply tray of the device using at least one workpiece supply tray motor of the device, the workpiece supply tray configured to support a supply of workpieces to be integrated into a device or devices under manufacture by at least one of the first and second robots;
   driving the first robot along the common X-axis and parallel to at least one of a Y-axis and a Z-axis to act upon a device under manufacture, the first robot comprising:

a first X-axis driven element configured for movement along the track defining the common X-axis;

a first Z-axis driven element, attached to the first X-axis driven element, configured for selective movement parallel to the Z-axis and along the common X-axis;

a first Y-axis driven element, attached to the first Z-axis driven element, configured for selective movement parallel to the Y-axis, the Z-axis and along the common X-axis; and a first end-effector, attached to the first Y-axis driven element and configured for acting upon devices under manufacture; and driving the second robot, independently of the first robot, along the common X-axis and parallel to at least one of the Y and Z axes to act upon a same device under manufacture as the first robot or a different device under manufacture, the second robot comprising:

a second X-axis driven element configured for movement along the track defining the common X-axis;

a second Z-axis driven element, attached to the second X-axis driven element, configured for selective movement parallel to the Z-axis along the common X-axis;

a second Y-axis driven element, attached to the second Z-axis driven element, configured for selective movement parallel to the Y-axis, the Z-axis and along the common X-axis; and a second end-effector, attached to the second Y-axis driven element and configured for acting upon devices under manufacture.

14. The method of claim 13, further comprising the controller guiding the first end effector based upon at least one image obtained from at least one of a first camera mounted to the first robot and a second camera fixed above the first robot.

15. The method of claim 13, further comprising guiding the second end effector based upon at least one image obtained from at least one of a third camera mounted to the second robot and a fourth camera fixed above the second robot.

16. The method of claim 13, further comprising relocating the workpiece supply tray after a workpiece is removed therefrom.

17. The method of claim 16, wherein relocating the workpiece supply tray after the workpiece is removed comprises relocating the workpiece supply tray so as to reduce a movement of at least one of the first and second robots as workpieces are removed from the at least one workpiece supply tray during manufacture of the device or devices.

18. The method of claim 13, further comprising relocating the at least one workpiece supply tray using the at least one workpiece supply tray motor to relocate the workpiece supply tray within reach of at least one of the first and second end-effectors.

19. The method of claim 13, further comprising:

removing at least one workpiece from the workpiece supply tray using at least one of the first end-effector and the second end-effector; and integrating the removed at least one workpiece into the device or devices under manufacture using at least one of the first and second end-effectors.

20. The method of claim 13, wherein the device further comprises at least one of a third robot and fourth robot, and wherein the method further comprises:

removing at least one workpiece from the workpiece supply tray using at least one of the third robot and the fourth robot; and transferring the removed at least one workpiece to at least one of the first end-effector and the second end-effector for integration into the device or devices under manufacture.

21. The method of claim 20, further comprising rotating the removed at least one workpiece using at least one of the third robot and the fourth robot for presentation to at least one of the first end-effector and the second end-effector.

* * * * *